(12) United States Patent
Zeng

(10) Patent No.: US 10,831,622 B2
(45) Date of Patent: Nov. 10, 2020

(54) METHOD AND APPARATUS FOR PROCESSING GATEWAY DEVICE FAULT

(71) Applicant: Alibaba Group Holding Limited, Grand Cayman (KY)

(72) Inventor: Wenqiu Zeng, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 135 days.

(21) Appl. No.: 15/986,742

(22) Filed: May 22, 2018

(65) Prior Publication Data

US 2018/0267869 A1    Sep. 20, 2018

Related U.S. Application Data

(63) Continuation of application No. PCT/CN2016/105821, filed on Nov. 15, 2016.

(30) Foreign Application Priority Data

Nov. 24, 2015  (CN) .......................... 2015 1 0827711

(51) Int. Cl.
  *G06F 11/00* (2006.01)
  *G06F 11/20* (2006.01)
  (Continued)

(52) U.S. Cl.
  CPC .......... *G06F 11/203* (2013.01); *G06F 9/4856* (2013.01); *G06F 9/4881* (2013.01);
  (Continued)

(58) Field of Classification Search
  CPC ..... G06F 11/203; G06F 9/4856; G06F 9/4881
  See application file for complete search history.

(56) References Cited

U.S. PATENT DOCUMENTS 7,152,179 B1 * 12/2006 Critchfield .............. H04L 12/56
                                                       714/4.11
7,225,356 B2 *  5/2007 Monitzer ............ G06F 11/2041
                                                          714/10
(Continued)

FOREIGN PATENT DOCUMENTS

CN         1614936 A      5/2005
CN         1701569 A     11/2005
(Continued)

OTHER PUBLICATIONS

First Search Report issued in corresponding International Application No. 201510827711.0 (2 pgs.).
(Continued)

*Primary Examiner* — Elmira Mehrmanesh
(74) *Attorney, Agent, or Firm* — Finnegan, Henderson, Farabow, Garrett & Dunner, LLP

(57) ABSTRACT

The present invention provides methods and apparatuses for processing a gateway device fault. According to one embodiment, when a fault on a gateway device is detected, computing tasks currently executed by the faulty gateway device are acquired; to-be-allocated computing tasks are screened out according to parameters configured when the computing tasks are issued; the computing tasks running on the faulty gateway device are terminated, and the to-be-allocated computing tasks are scheduled to other gateway devices in a normal state according to a preset scheduling strategy. Further, task states of the to-be-allocated computing tasks are recovered, and the to-be-allocated computing tasks are executed by the other gateway devices. Embodiments of the present application can help avoid the problem that computing tasks fail due to a fault occurring in the gateway device, thereby the overall execution efficiency of the computing tasks and ensuring system stability.

18 Claims, 5 Drawing Sheets

(51) Int. Cl.
*G06F 9/48* (2006.01)
*H04L 12/24* (2006.01)
*H04L 12/911* (2013.01)
*H04L 12/66* (2006.01)

(52) U.S. Cl.
CPC .......... *H04L 12/66* (2013.01); *H04L 41/0654* (2013.01); *H04L 41/0668* (2013.01); *H04L 47/70* (2013.01); *G06F 2201/85* (2013.01); *H04L 41/0631* (2013.01)

(56) References Cited

U.S. PATENT DOCUMENTS

| | | | |
|---|---|---|---|
| 7,886,196 B2* | 2/2011 | Reichert | G06F 11/362 714/39 |
| 8,127,174 B1 | 2/2012 | Shah et al. | |
| 8,135,981 B1* | 3/2012 | Gawali | G06F 11/0727 714/42 |
| 8,856,583 B1* | 10/2014 | Visser | G06F 11/2094 714/4.11 |
| 9,280,390 B2* | 3/2016 | Sirota | G06F 9/5061 |
| 10,146,653 B2* | 12/2018 | Brown | G06F 11/2242 |
| 2009/0003320 A1 | 1/2009 | Luo et al. | |
| 2012/0239697 A1* | 9/2012 | Ram | G06F 16/273 707/781 |
| 2016/0234300 A1* | 8/2016 | Khanna | G06F 9/5072 |
| 2018/0329789 A1* | 11/2018 | Shang | G06F 11/2023 |

FOREIGN PATENT DOCUMENTS

| | | |
|---|---|---|
| CN | 102098096 A | 6/2011 |
| CN | 102385536 A | 3/2012 |
| CN | 102411520 A | 4/2012 |
| CN | 102801542 A | 11/2012 |
| CN | 104461752 A | 3/2015 |
| CN | 104536770 A | 4/2015 |
| CN | 106789141 A | 5/2017 |
| WO | WO 2017088681 A1 | 6/2017 |

OTHER PUBLICATIONS

First Office Action issued by the State Intellectual Property Office of People's Republic of China in corresponding Chinese Application No. 201510827711.0 dated Jul. 29, 2019 (13 pgs.).
PCT International Search Report and Written Opinion dated Feb. 8, 2017, issued in corresponding International Application No. PCT/CN2016/105821 (13 pgs.).
Second Chinese Office Action issued in Chinese Application No. 201510827711.0 dated Dec. 12, 2019, 12 pages.
Supplemental Chinese Search Report issued in corresponding Chinese Application No. 201510827711.0 dated Dec. 3, 2019 (1 page).

* cited by examiner

METHOD AND APPARATUS FOR PROCESSING GATEWAY DEVICE FAULT

This application claims priority to International Application No. PCT/CN2016/105821, filed on Nov. 15, 2016, which claims priority to and the benefits of priority to Chinese Application No. 201510827711.0, filed on Nov. 24, 2015, both of which are incorporated herein by reference in their entireties.

TECHNICAL FIELD

The present application generally relates to the field of communications technologies, and in particular, to methods and apparatuses for processing a gateway device fault.

BACKGROUND

With continuous development of the Internet, big data has permeated into nearly every industry and every business functional area and it has become an important factor of production. Mining and application of mass data heralds the advent of new productivity growth and consumer surplus. The concept of "big data" has been around for a long time in fields such as physics, biology, and environmental ecology, and in industries such as military, finance, and communications. And in recent years, it has attracted increasing public attention, thanks to the development of the Internet and information industry.

At present, large and medium-sized Internet service providers or platform operators generally deploy dedicated data management platforms to research into user behaviors based on big data. On these data management platforms, multiple servers generally form a cluster to jointly process data. Gateway devices are further connected to the server cluster and are responsible for submitting related data analysis and computing tasks to the server cluster.

A fault may occur in a gateway device due to objective factors during data analysis. In such cases, failover processing is needed. Failover processing refers to a backup operational mode. When a major component fails to operate due to invalidity or a predetermined shutdown time, functions of a system component (such as a processor, a server, a network or a database) in this mode are transferred to a secondary system component. During the process of data analysis, a fault of the gateway device may occur in the following situations.

Situation 1: The gateway device is down. In this case, the gateway device will be restarted, and a main control computer for distributing computing tasks performs the failover processing.

Situation 2: A network between the gateway device and the system is disconnected, but processes of the gateway device survive. In this case, the gateway device needs to ensure that started processes are terminated, and then a main control computer for distributing computing tasks performs the failover processing.

Situation 3: Processes on the gateway device crash. In this case, a mechanism is needed to ensure that the processes on the gateway device are terminated, and a main control computer for distributing computing tasks performs the failover processing.

To deal with the above fault situations, as shown in FIG. 1, an existing failover processing method includes the following steps:

In step S101, a fault (including down, network disconnection, process crash, and the like) occurs in a gateway device.

In step S102, failover processing is triggered.

In step S103, computing tasks on the current gateway device are terminated.

In step S104, tasks submitted by the current gateway device to a computing cluster are terminated.

In step S105, the computing tasks are rescheduled to another gateway device.

In step S106, the computing tasks are rerun.

It is discovered that in the existing technologies, failover processing of a computing task is very costly when a fault such as down, network disconnection, and process crash occurs in a gateway device. This is because the whole computing task needs to be rerun from the beginning, which wastes computing resources and prolongs the run time of the computing task, causing extremely low efficiency.

SUMMARY

The present application provides methods and apparatuses for processing a gateway device fault. One object of the present application is to ensure normal running of the already-started computing tasks when a fault occurs in a gateway device, thus saving computing resources and improving processing efficiency of computing tasks.

According to some embodiments of the present application, one exemplary method for processing a gateway device fault includes the following steps: acquiring computing tasks currently executed by a gateway device, when a fault is detected on the gateway device; screening out to-be-allocated computing tasks according to parameters configured when the computing tasks are issued, the parameters being used to indicate whether the computing tasks require failover processing; terminating the computing tasks currently running on the faulty gateway device, and scheduling the to-be-allocated computing tasks to other gateway devices currently in a normal state according to a preset scheduling strategy; and recovering task states of the to-be-allocated computing tasks, and executing the to-be-allocated computing tasks by using the other gateway devices.

In some embodiments, the step of acquiring computing tasks currently executed by a gateway device, when a fault is detected on the gateway device can include: detecting temporary files registered by all current gateway devices during boot-up; and when a temporary file is deleted, using a gateway device corresponding to the deleted temporary file as the faulty gateway device, and acquiring computing tasks currently executed by the gateway device.

In some embodiments, the step of screening out to-be-allocated computing tasks according to parameters configured when the computing tasks are issued can further include: determining whether a failover processing value of a parameter is in a valid state; placing the computing task into a highest-priority queue as the to-be-allocated computing task if the failover processing value is in the valid state; and setting the computing task to an error state if the failover processing value is in an invalid state.

In some embodiments, the step of terminating the computing tasks currently running on the faulty gateway device can include: if a current fault type of the gateway device is network disconnection, traversing all current processes of the gateway device and terminating resident processes of the gateway device; and if a current fault type of the gateway device is process crash, terminating resident processes started by the gateway device.

In some embodiments, after the step of executing the to-be-allocated computing tasks by using the other gateway devices, the method can further include: querying task states of the to-be-allocated computing tasks, and querying whether the to-be-allocated computing tasks are running on the other gateway devices; acquiring task states and logs of the to-be-allocated computing tasks, if the to-be-allocated computing tasks are running; resubmitting the to-be-allocated computing tasks and acquiring task states and logs of the to-be-allocated computing tasks, if the to-be-allocated computing tasks fail to fun; and submitting other computing tasks after the to-be-allocated computing tasks and acquiring task states and logs of the other computing tasks, if the to-be-allocated computing tasks are completed.

According to some embodiments of the present application, apparatuses for processing a gateway device fault are provided. One exemplary apparatus for processing a gateway device fault includes: an acquisition module configured to acquire computing tasks currently executed by a gateway device, when a fault is detected on the gateway device; a screening module configured to screen out to-be-allocated computing tasks according to parameters configured when the computing tasks are issued, the parameters being used to indicate whether the computing tasks require failover processing; a termination module configured to terminate the computing tasks currently running on the faulty gateway device, and schedule the to-be-allocated computing tasks to other gateway devices currently in a normal state according to a preset scheduling strategy; and a recovery module configured to recover task states of the to-be-allocated computing tasks and execute the to-be-allocated computing tasks by using the other gateway devices.

In some embodiments, the acquisition module can be configured to: detect temporary files registered by all current gateway devices during boot-up; and when a temporary file is deleted, use a gateway device corresponding to the deleted temporary file as the faulty gateway device, and acquire computing tasks currently executed by the gateway device.

In some embodiments, the screening module can be further configured to: determine whether a failover processing value of the parameter is in a valid state; place the computing task into a highest-priority queue as the to-be-allocated computing task if the failover processing value is in the valid state; and set the computing task to an error state if the failover processing value is in an invalid state.

In some embodiments, the termination module can be further configured to: if a current fault type of the gateway device is network disconnection, traverse all current processes of the gateway device and terminate resident processes of the gateway device; and if a current fault type of the gateway device is process crash, terminate resident processes started by the gateway device.

In some embodiments, the apparatus can further include: a query module configured to query task states of the to-be-allocated computing tasks, and query whether the to-be-allocated computing tasks are running on the other gateway devices. The query module can be configured to: acquire task states and logs of the to-be-allocated computing tasks, if the to-be-allocated computing tasks are running; resubmit the to-be-allocated computing tasks, and acquire task states and logs of the to-be-allocated computing tasks, if the to-be-allocated computing tasks fail in running; submit other computing tasks after the to-be-allocated computing tasks and acquire task states and logs of the other computing tasks, if the to-be-allocated computing tasks are completed.

According to some embodiments of the present application, when a fault is detected on a gateway device, computing tasks currently executed by the faulty gateway device are acquired; to-be-allocated computing tasks are determined according to parameters configured when the computing tasks are issued; the computing tasks currently running on the faulty gateway device are terminated, and the to-be-allocated computing tasks are scheduled to other gateway devices currently in a normal state according to a preset scheduling strategy. Further, task states of the to-be-allocated computing tasks can be recovered, and the to-be-allocated computing tasks are executed by the other gateway devices. Embodiments of the present application can address the problem that the computing tasks fail due to a fault occurring in the gateway device, thereby improving the overall execution efficiency of the computing tasks and ensuring system stability.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods according to some embodiments of the present disclosure, the scope of which is defined by the appended.

As described above in the background section, a data processing/scheduling platform in the existing technologies generally needs to rerun computing tasks when the computing tasks fail due to a fault such as down, network disconnection, and process crash in a single gateway device. This greatly reduces data processing efficiency.

According to some embodiments of the present application, methods for processing a gateway device fault are provided. The methods can be applied, for example, in a data processing/scheduling platform in which data computing tasks are run by gateway devices. It should be appreciated that the methods can be applied to different computing task types or platform types, which does not affect the protection scope of the present application.

Figure 1:
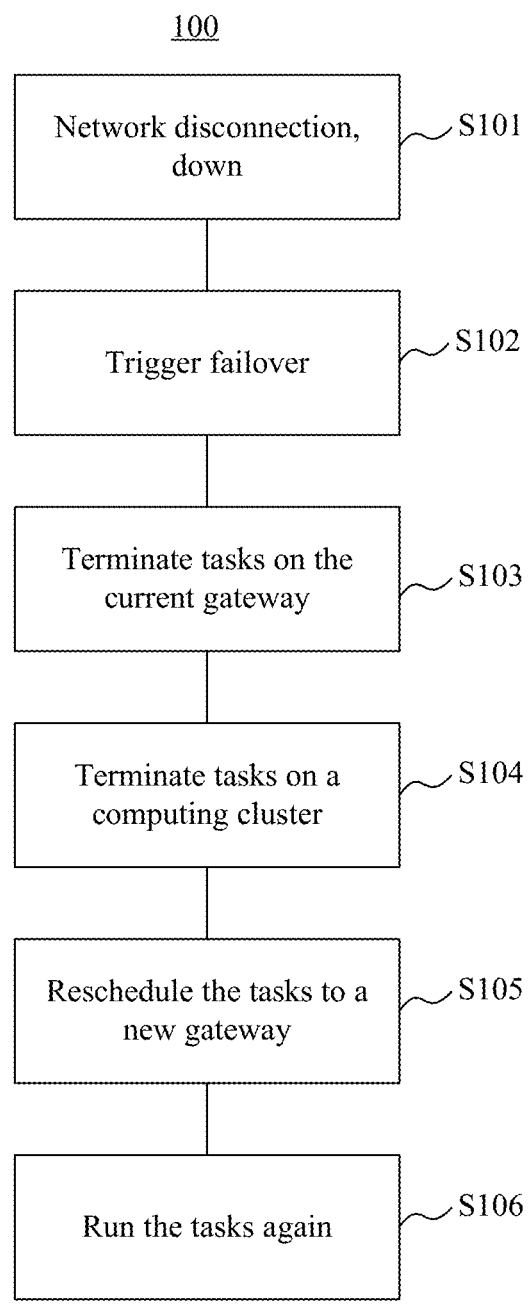
FIG. 1 is a schematic diagram of an existing method of performing failover processing for a gateway device.
Figure 2:
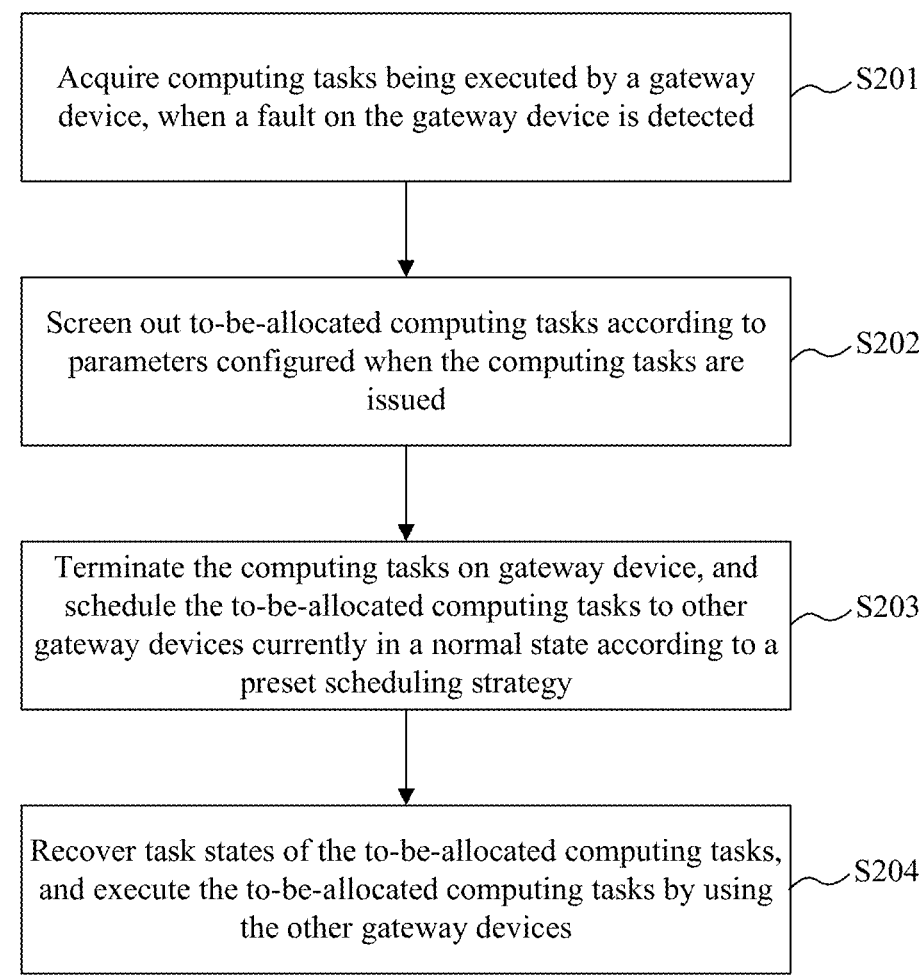
FIG. 2 is a schematic flowchart of an exemplary method for processing a gateway device fault according to some embodiments of the present application.

FIG. 2 is a schematic flowchart of an exemplary method 200 for processing a gateway device fault according to some embodiments of the present application. The exemplary method 200 includes the following steps:

In step S201, computing tasks currently executed by a gateway device are acquired when a fault is detected on the gateway device.

In some embodiments, based on the features with respect to gateway devices running computing tasks, temporary files registered by all current gateway devices during boot-up are detected in real time. When a temporary file is deleted, a gateway device corresponding to the deleted temporary file can be used as the faulty gateway device, and computing tasks currently executed by the gateway device can be acquired.

It should be appreciated that, the above manner of determining whether the gateway device is faulty is merely an example. Other techniques can be used, consistent with the disclosure of this application. For example, the gateway devices can be detected in real time by additionally setting another detection device or using another detection method. Other variations or improvements based on the disclosure herein shall all belong to the protection scope of the present application.

In step S202, to-be-allocated computing tasks are screened out according to parameters configured when the computing tasks are issued, the parameters being used to indicate whether the computing tasks require failover processing.

One of the objectives of the present application is to ensure that computing tasks in a faulty network device do not need to be restarted due to a failure. Accordingly, in some embodiments, an additional parameter can be pre-configured for each computing task when issuing the computing tasks to the gateway devices. Such parameters correspond, in a one-to-one manner, to the computing tasks, and they can be used to indicate whether the computing tasks require failover processing when a fault occurs in a gateway device. In some embodiments, when to-be-allocated computing tasks are screened out based on the parameters, it can be determined whether a failover processing value of the parameter corresponding to a computing task is in a valid state. If the failover processing value is in the valid state, the computing task can be placed in a highest-priority queue as a to-be-allocated computing task. If the failover processing value is in an invalid state, the computing task can be set to an error state, that is, no subsequent processing is performed for the computing task.

In step S203, the computing tasks currently running on the faulty gateway device are terminated, and the to-be-allocated computing tasks are scheduled to other gateway devices currently in a normal state according to a preset scheduling strategy.

In some fault situations, the gateway device is not in a completely disabled state. In such cases, some computing tasks in the gateway device are still running. In order to avoid conflict after subsequent reallocation, the computing tasks currently running on the faulty gateway device can be terminated. In some embodiments, based on different fault types of the gateway device, the computing tasks can be terminated in different manners. For example, if a current fault type of the gateway device is network disconnection, all current processes of the gateway device are traversed and resident processes of the gateway device are terminated. If a current fault type of the gateway device is process crash, resident processes started by the gateway device are terminated.

Although only two fault situations are described above, it is appreciated that those terminated in the art can adopt other process terminating manners according to a specific actual fault type. Moreover, the scheduling strategy can also be set according to actual situations. For example, the other gateway devices can be selected based on load balance, or a backup normal gateway device can be selected.

In step S204, task states of the to-be-allocated computing tasks are recovered, and the to-be-allocated computing tasks are executed by using the other gateway devices.

After the other gateway devices for processing the to-be-allocated computing tasks are determined and the computing tasks are allocated, the task states of the to-be-allocated computing tasks are recovered and the to-be-allocated computing tasks can be run again. This process can be implemented by using indication signaling between the other gateway devices. It can also be implemented through operation by the gateway devices.

Moreover, to ensure that the to-be-allocated computing tasks can be completed normally, in some embodiments, after the above processing, task states of the to-be-allocated computing tasks and whether the to-be-allocated computing tasks are running on the other gateway devices can be queried actively, or periodically. Further processing can be performed based on the query results, as described below.

If the to-be-allocated computing tasks are running, task states and logs of the to-be-allocated computing tasks can be acquired. If the to-be-allocated computing tasks fail to run, the to-be-allocated computing tasks can be resubmitted, and task states and logs of the to-be-allocated computing tasks can be acquired. If the to-be-allocated computing tasks are completed, other computing tasks following the to-be-allocated computing tasks can be submitted, and task states and logs of the other computing tasks can be acquired.

By using the above embodiments, after a fault such as down, network disconnection, and process crash occurs in the gateway device, the task states when the fault occurs can be recovered promptly. This can help avoid task failure, improve task processing efficiency, and ensure system stability.

Figure 3:
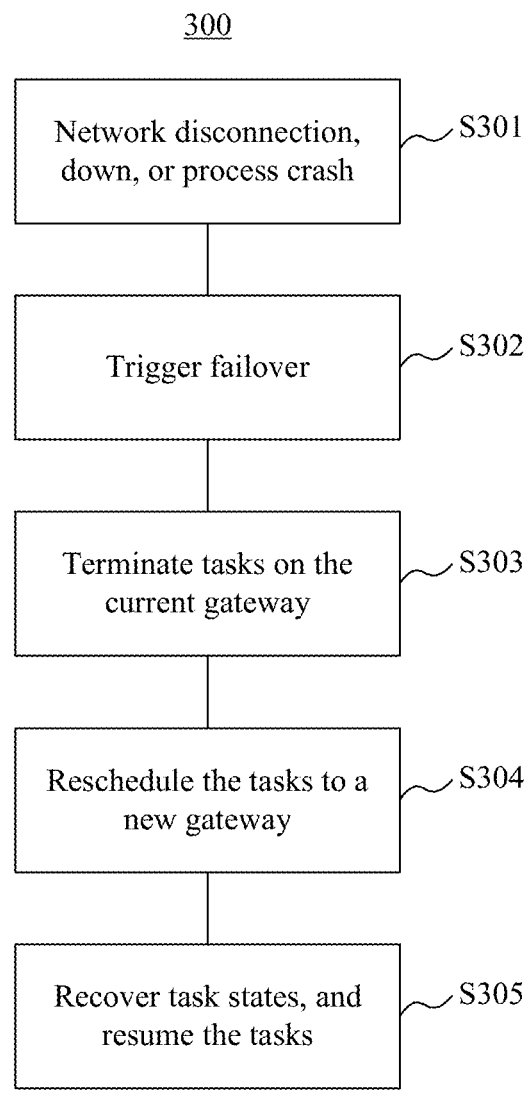
FIG. 3 is a schematic flowchart of an exemplary process of performing failover and resuming tasks according to some embodiments of the present application.
Figure 4:
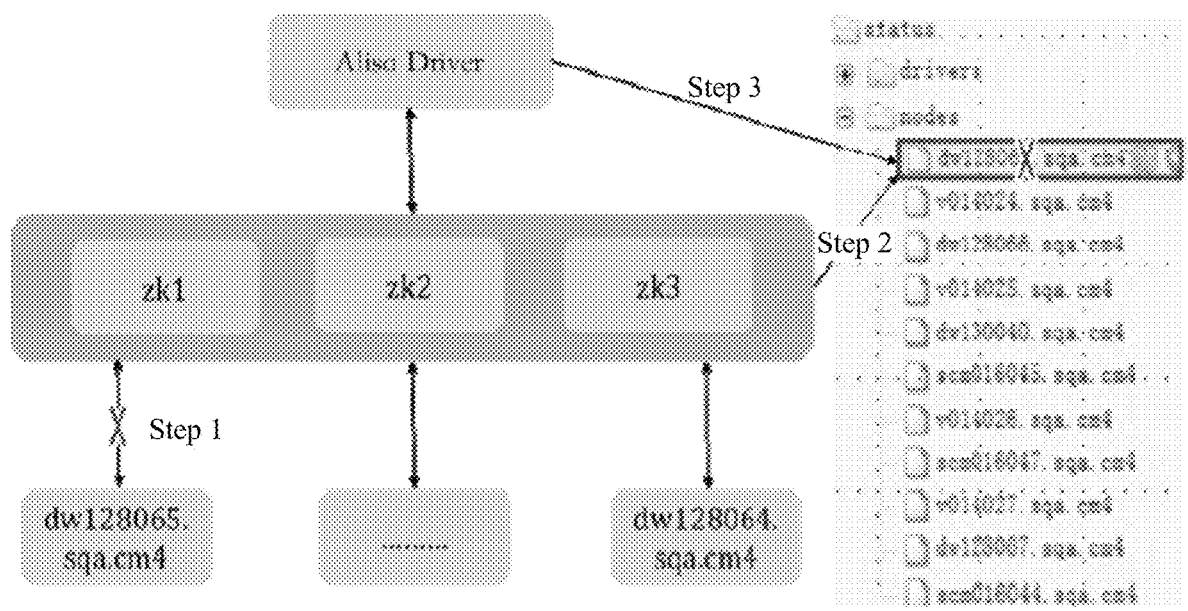
FIG. 4 is a state diagram associated with an exemplary process of performing failover according to some embodiments of the present application.

To further illustrate the technical solutions provided in the present disclosure, the technical solution according to some embodiments of the present application is further described with reference to the following application scenario. For example, in a large-scale data warehouse, a typical Etl task may include multiple sqls (tasks). A failover mechanism can be triggered if a gateway device is down while running, for example, sql2. FIG. 3 is a schematic flowchart of an exemplary process 300 of performing failover and resuming tasks according to some embodiments of the present application. As shown in FIG. 3, the exemplary process 300 includes the following procedures:

In step 301, a fault (such as down, network disconnection, process crash) occurs in a gateway device. When an abnormality such as down, network disconnection, and process crash occurs in the gateway device, the gateway device can be disconnected from a program coordination platform. Taking Step 1 and Step 2 in FIG. 4 as an example, the program coordination platform can delete a temporary file registered during boot-up of a node (as shown on the right side of FIG. 4, there are multiple temporary files after the folder "nodes" is expanded, among which the first file dw128065.sqa.cm4 is a file corresponding to a gateway device dw128065.sqa.cm4), after a session time expires.

In step 302, a failover mechanism is triggered. A task distribution platform monitors the/nodes directory constantly and can detect disappearance of a temporary file and trigger the failover mechanism of the gateway device. The task distribution platform can acquire, from the program coordination platform, all tasks currently being executed by the gateway device for which the failover mechanism is triggered.

Whether a failover operation needs to be executed for a certain task depends on the parameters of the issued task.

For example, when failover=0, the task distribution platform can set the task to an error state and can call the task back to an upstream system. When failover=1, the task distribution platform can place the task into a queue having the highest priority (priority=1), to wait for redistribution by a scheduler.

In step 303, tasks running on the current gateway device are terminated. This can include the following scenarios. When the gateway device is down, all tasks on the gateway device are terminated, without any additional terminate processing. When the gateway device is disconnected from the network, resident processes on the gateway device can be sensed by the program coordination platform. Then all processes on the device are traversed, and the resident processes can be terminated one by one. If resident processes crash, when the resident processes are started, the tasks started by the gateway device can be terminated by using a script.

In step 304, tasks are rescheduled to a new gateway device. In some embodiments, the tasks can be scheduled to a machine with the lowest load, based on factors such as status of the CPU, memory, bandwidth, and so on.

In step 305, task states are recovered and tasks are resumed. After the tasks are rescheduled to the new gateway device, new task processes are started. In some embodiments, after the tasks are started, task states are queried from the program coordination platform, as described below using sql2 as an example. The query process can further include: querying whether sql2 is still running in a server cluster. An execution state of a sql can be acquired from the server cluster. An identifier of the gateway device submitting the sql and a running state of the sql can be acquired from the returned result. Different processing can be carried out based on different states of the sql. For example, in this scenario: if sql2 is still running, a task state and a task log can be acquired continuously. If sql2 fails to run, sql2 can be resubmitted, and a task state and a task log can be acquired. If sql2 is completed (successfully), sql3 can be submitted, and a task state and a task log can be acquired.

Figure 5:
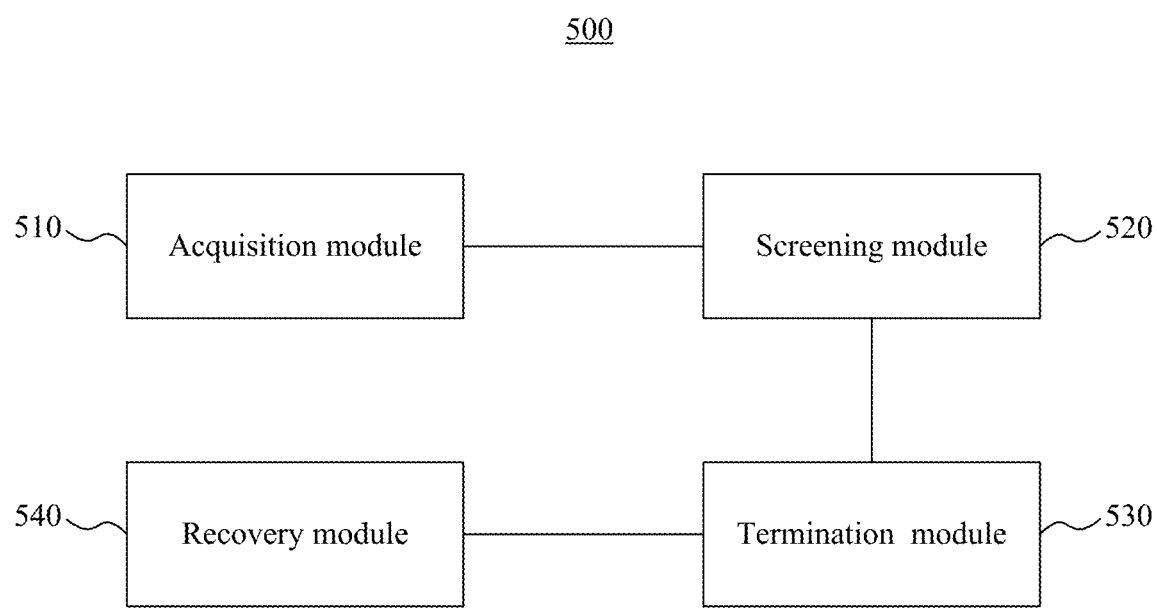
FIG. 5 is a schematic structural diagram of an exemplary apparatus for processing a gateway device fault according to some embodiments of the present application.

With the above described embodiments, when the failover mechanism is triggered, the whole task can be resumed from sql2 when the whole task is transferred to another gateway device, ensuring that important tasks will not fail due to the device fault According to some embodiments of the present application, apparatuses for processing a gateway device fault are provided. FIG. 5 is a schematic structural diagram of an exemplary apparatus 500 for processing a gateway device fault according to some embodiments of the present application. As shown in FIG. 5, the exemplary apparatus 500 includes an acquisition module 510, a screening module 520, a termination module 530, and a recovery module 540.

The acquisition module 510 can be configured to acquire computing tasks currently executed by a gateway device, when a fault is detected on the gateway device.

The screening module 520 can be configured to screen out to-be-allocated computing tasks according to parameters configured when the computing tasks are issued. The parameters can be used to indicate whether the computing tasks require failover processing.

The termination module 530 can be configured to terminate the computing tasks currently running on the faulty gateway device and schedule the to-be-allocated computing tasks to other gateway devices currently in a normal state according to a preset scheduling strategy.

The recovery module 540 can be configured to recover task states of the to-be-allocated computing tasks and execute the to-be-allocated computing tasks by using the other gateway devices.

In some embodiments, the acquisition module 510 can be further configured to detect temporary files registered by each current gateway device during boot-up. When a temporary file is deleted, acquisition module 510 can use a gateway device corresponding to the deleted temporary file as the faulty gateway device, and acquire computing tasks currently running on the gateway device.

In some embodiments, the screening module 520 can be further configured to determine whether a failover processing value of a parameter corresponding to a computer task is in a valid state; place the computing task into a highest-priority queue as the to-be-allocated computing task if the failover processing value is in the valid state; and set the computing task to an error state if the failover processing value is in an invalid state.

In some embodiments, the termination module 530 can be further configured to: if a current fault type of the gateway device is network disconnection, traverse all current processes of the gateway device and terminate resident processes of the gateway device; and if a current fault type of the gateway device is process crash, terminate resident processes started by the gateway device.

In some embodiments, the apparatus 500 can further include a query module. The query module can be configured to query task states of the to-be-allocated computing tasks, and query whether the to-be-allocated computing tasks are running on the other gateway devices. The query process can further include the following three scenarios.

If the to-be-allocated computing tasks are running, the query module can be configured to acquire task states and logs of the to-be-allocated computing tasks.

If the to-be-allocated computing tasks fail to run, the query module can be configured to resubmit the to-be-allocated computing tasks, and acquire task states and logs of the to-be-allocated computing tasks.

If the to-be-allocated computing tasks are completed, the query module can be configured to submit other computing tasks following the to-be-allocated computing tasks, and acquire task states and logs of the other computing tasks.

In view of the above described embodiments, when a fault is detected on a gateway device, computing tasks currently executed by the faulty gateway device are acquired; to-be-allocated computing tasks are screened out according to parameters configured when the computing tasks are issued; the computing tasks currently running on the faulty gateway device are terminated, and the to-be-allocated computing tasks are scheduled to other gateway devices currently in a normal state according to a preset scheduling strategy. Further, task states of the to-be-allocated computing tasks can be recovered, and the to-be-allocated computing tasks can be executed by the other gateway devices. The above embodiments address the problem that the computing tasks fail due to a fault occurring in the gateway device, thereby improving the overall execution efficiency of the computing tasks and ensuring system stability.

In view of the description of the above exemplary embodiments, it is appreciated that the disclosed embodiments can be implemented by hardware, or by software plus a hardware platform. Further, consistent with such an understanding, the technical solutions of the disclosed embodiments may also be implemented in a form of a software product. The software product can be stored in a non-volatile storage medium (which can be a CD-ROM, a USB flash memory, a mobile hard disk, and the like), and includes several instructions for enabling a computer device (which may be a personal computer, a tablet, a server, a network device, or the like) to perform the processing described above with respect to the exemplary embodiments of the present invention.

For example, the foregoing storage medium may include, for example, any medium that can store a program code, such as a USB flash disk, a removable hard disk, a Read-Only Memory (ROM), a Random Access Memory (RAM), a magnetic disk, or an optical disc. The storage medium can be a non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

It should be appreciated that the accompanying drawings are merely schematic diagrams according to some exemplary embodiments. Certain modules or processes illustrated in the accompanying drawings may not be required for implementing the present invention in actual application. It is appreciated that the modules in the apparatus embodiments described above can be distributed as shown in the above-described scenarios and can also be modified or installed in one or more apparatuses, different from the example scenario described herein. For example, the modules described in the above implementation scenario can be combined into one module or can be further divided into multiple sub-modules. Further, the serial numbers used in this disclosure are merely used for description purposes, and they do not represent priorities or preferences of implementation scenarios.

The above described embodiments are merely exemplary. It should be appreciated that the disclosed embodiments are not limited to the implementation scenarios described herein. All variations or modifications, consistent with the present disclosure, shall fall within the protection scope of the present invention.

The invention claimed is:

1. A method for processing a gateway device fault, comprising:
monitoring temporary files registered by a plurality of gateway devices during boot-up;
in response to a temporary file of the temporary files having been deleted, identifying, among the plurality of gateway devices, a gateway device corresponding to the deleted temporary file;
acquiring computing tasks being executed by the identified gateway device;
identifying to-be-allocated computing tasks among the acquired computing tasks according to parameters configured when the computing tasks are issued, the parameters indicating whether the computing tasks require failover processing;
scheduling the to-be-allocated computing tasks to one or more other gateway devices; and
recovering task states of the to-be-allocated computing tasks to enable executing each of the to-be-allocated computing tasks by the one or more other gateway devices based on the task state of each to-be-allocated computing task.

2. The method of claim 1, further comprising:
terminating the computing tasks on the gateway device after the fault is detected.

3. The method of claim 2, wherein terminating the computing tasks on the gateway device further comprises:
in response to a fault type of the gateway device being network disconnection, traversing processes of the gateway device and terminating resident processes of the gateway device; or
in response to a fault type of the gateway device being process crash, terminating resident processes started by the gateway device.

4. The method of claim 1, wherein scheduling the to-be-allocated computing tasks to one or more other gateway devices comprises:
scheduling the to-be-allocated computing tasks to the one or more other gateway devices according to a preset scheduling strategy.

5. A method for processing a gateway device fault, comprising:
acquiring computing tasks being executed by a gateway device in response to a fault on the gateway device has been detected;
identifying to-be-allocated computing tasks among the acquired computing tasks according to parameters configured when the computing tasks are issued, the parameters indicating whether the computing tasks require failover processing by at least one of:
determining whether a failover processing value of a parameter corresponding to a computing task is in a valid state;
placing the computing task into a queue as a to-be-allocated computing task in response to the failover processing value being in the valid state; or
setting the computing task to an error state in response to the failover processing value being in an invalid state; and
recovering task states of the to-be-allocated computing tasks to enable executing each of the to-be-allocated computing tasks by the one or more other gateway devices based on the task state of each to-be-allocated computing task.

6. A method for processing a gateway device fault, comprising:
acquiring computing tasks being executed by a gateway device in response to a fault on the gateway device has been detected;
identifying to-be-allocated computing tasks among the acquired computing tasks according to parameters configured when the computing tasks are issued, the parameters indicating whether the computing tasks require failover processing;
scheduling the to-be-allocated computing tasks to one or more other gateway devices; and
recovering task states of the to-be-allocated computing tasks to enable executing each of the to-be-allocated computing tasks by the one or more other gateway devices based on the task state of each to-be-allocated computing task, by at least one of the following:
querying task states of the to-be-allocated computing tasks; and
in response to at least some of the to-be-allocated computing tasks running, acquiring task states and logs of the at least some of the to-be-allocated computing tasks that are running;
in response to at least some of the to-be-allocated computing tasks failing to run, resubmitting the at least some of the to-be-allocated computing tasks that had failed to run and acquiring task states and logs of the at least some of the to-be-allocated computing tasks; or in response to at least some of the to-be-allocated computing tasks being completed, submitting other computing tasks and acquiring task states and logs of the other computing tasks.

7. An apparatus for processing a gateway device fault, comprising:

a memory storing a set of instructions; and at least one processor configured to execute the set of instructions to cause the apparatus to perform:

monitoring temporary files registered by a plurality of gateway devices during boot-up;

in response to a temporary file of the temporary files having been deleted, identifying, among the plurality of gateway devices, a gateway device corresponding to the deleted temporary file;

acquiring computing tasks being executed by the identified gateway device;

identifying to-be-allocated computing tasks among the acquired computing tasks according to parameters configured when the computing tasks are issued, the parameters indicating whether the computing tasks require failover processing;

scheduling the to-be-allocated computing tasks to one or more other gateway devices; and recovering task states of the to-be-allocated computing tasks to enable executing each of the to-be-allocated computing tasks by the one or more other gateway devices based on the task state of each to-be-allocated computing task.

8. The apparatus of claim 7, wherein the termination module is further configured to:

terminate the computing tasks on the gateway device after the fault is detected.

9. The apparatus of claim 8, wherein terminating the computing tasks on the gateway device comprises:

in response to a fault type of the gateway device being network disconnection, traversing processes of the gateway device and terminating resident processes of the gateway device; and in response to a fault type of the gateway device being process crash, terminating resident processes started by the gateway device.

10. The apparatus of claim 7, wherein the at least one processor is configured to execute the set of instructions to cause the apparatus to perform:

scheduling the to-be-allocated computing tasks to the one or more other gateway devices according to a preset scheduling strategy.

11. An apparatus for processing a gateway device fault, comprising:

a memory storing a set of instructions; and at least one processor configured to execute the set of instructions to cause the apparatus to perform:

acquiring computing tasks being executed by a gateway device in response to a fault on the gateway device has been detected;

identifying to-be-allocated computing tasks among the acquired computing tasks according to parameters configured when the computing tasks are issued, the parameters indicating whether the computing tasks require failover processing by at least one of:

determining whether a failover processing value of a parameter corresponding to a computer task is in a valid state;

placing the computing task into a queue as a to-be-allocated computing task if the failover processing value is in the valid state; or setting the computing task to an error state if the failover processing value is in an invalid state; and recovering task states of the to-be-allocated computing tasks to enable executing each of the to-be-allocated computing tasks by the one or more other gateway devices based on the task state of each to-be-allocated computing task.

12. An apparatus for processing a gateway device fault, comprising:

a memory storing a set of instructions; and at least one processor configured to execute the set of instructions to cause the apparatus to perform:

acquiring computing tasks being executed by a gateway device in response to a fault on the gateway device has been detected;

identifying to-be-allocated computing tasks among the acquired computing tasks according to parameters configured when the computing tasks are issued, the parameters indicating whether the computing tasks require failover processing;

scheduling the to-be-allocated computing tasks to one or more other gateway devices; and recovering task states of the to-be-allocated computing tasks to enable executing each of the to-be-allocated computing tasks by the one or more other gateway devices based on the task state of each to-be-allocated computing task, by at least one of the following:

querying task states of the to-be-allocated computing tasks;

in response to at least some of the to-be-allocated computing tasks running, acquiring task states and logs of the at least some of the to-be-allocated computing tasks;

in response to at least some of the to-be-allocated computing tasks failing to run, resubmitting the at least some of the to-be-allocated computing tasks, and acquire task states and logs of the at least some of the to-be-allocated computing tasks; and in response to at least some of the to-be-allocated computing tasks being completed, submitting other computing tasks, and acquire task states and logs of the other computing tasks.

13. A non-transitory computer readable medium that stores a set of instructions that is executable by at least one processor of a computer to cause the computer to perform a method for processing a gateway device fault, the method comprising:

monitoring temporary files registered by a plurality of gateway devices during boot-up;

in response to a temporary file of the temporary files having been deleted, identifying, among the plurality of gateway devices, a gateway device corresponding to the deleted temporary file;

acquiring computing tasks being executed by the identified gateway device;

identifying to-be-allocated computing tasks among the acquired computing tasks according to parameters configured when the computing tasks are issued, the parameters indicating whether the computing tasks require failover processing;

scheduling the to-be-allocated computing tasks to one or more other gateway devices; and recovering task states of the to-be-allocated computing tasks to enable executing each of the to-be-allocated computing tasks by the one or more other gateway devices based on the task state of each to-be-allocated computing task.

14. The non-transitory computer readable medium according to claim 13, wherein the set of instructions that is executable by the at least one processor of the computer causes the computer to further perform:
terminating the computing tasks on the gateway device after the fault is detected.

15. The non-transitory computer readable medium according to claim 14, wherein terminating the computing tasks on the gateway device comprises:
in response to a fault type of the gateway device being network disconnection, traversing processes of the gateway device and terminating resident processes of the gateway device; and
in response to a fault type of the gateway device being process crash, terminating resident processes started by the gateway device.

16. The non-transitory computer readable medium according to claim 13, wherein scheduling the to-be-allocated computing tasks to one or more other gateway devices comprises:
scheduling the to-be-allocated computing tasks to the one or more other gateway devices according to a preset scheduling strategy.

17. A non-transitory computer readable medium that stores a set of instructions that is executable by at least one processor of a computer to cause the computer to perform a method for processing a gateway device fault, the method comprising:
acquiring computing tasks being executed by a gateway device in response to a fault on the gateway device has been detected;
identifying to-be-allocated computing tasks among the acquired computing tasks according to parameters configured when the computing tasks are issued, the parameters indicating whether the computing tasks require failover processing by at least one of:
determining whether a failover processing value of a parameter corresponding to a computer task is in a valid state;
placing the computing task into a queue as a to-be-allocated computing task if the failover processing value is in the valid state; or
setting the computing task to an error state if the failover processing value is in an invalid state; and
recovering task states of the to-be-allocated computing tasks to enable executing each of the to-be-allocated computing tasks by the one or more other gateway devices based on the task state of each to-be-allocated computing task.

18. A non-transitory computer readable medium that stores a set of instructions that is executable by at least one processor of a computer to cause the computer to perform a method for processing a gateway device fault, the method comprising:
acquiring computing tasks being executed by a gateway device in response to a fault on the gateway device has been detected;
identifying to-be-allocated computing tasks among the acquired computing tasks according to parameters configured when the computing tasks are issued, the parameters indicating whether the computing tasks require failover processing;
scheduling the to-be-allocated computing tasks to one or more other gateway devices; and
recovering task states of the to-be-allocated computing tasks to enable executing each of the to-be-allocated computing tasks by the one or more other gateway devices based on the task state of each to-be-allocated computing task, by at least one of the following:
querying task states of the to-be-allocated computing tasks; and
acquiring, in response to at least some of the to-be-allocated computing tasks running, task states and logs of the at least some of the to-be-allocated computing tasks;
resubmitting, in response to at least some of the to-be-allocated computing tasks failing to run, the at least some of the to-be-allocated computing tasks, and acquiring task states and logs of the at least some of the to-be-allocated computing tasks; and
submitting, in response to at least some of the to-be-allocated computing tasks being completed, other computing tasks, and acquiring task states and logs of the other computing tasks.

* * * * *